(12) United States Patent
Liu et al.

(10) Patent No.: US 7,830,486 B2
(45) Date of Patent: Nov. 9, 2010

(54) PIXEL STRUCTURE AND LIQUID CRYSTAL DISPLAY PANEL

(75) Inventors: Chih-Chung Liu, Changhua County (TW); Ming-Tsung Wang, Keelung (TW); Yueh-Ping Chang, Kaohsiung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 613 days.

(21) Appl. No.: 11/864,989

(22) Filed: Sep. 29, 2007

(65) Prior Publication Data

US 2008/0180625 A1    Jul. 31, 2008

(30) Foreign Application Priority Data

Jan. 25, 2007    (TW) .............................. 96102845 A

(51) Int. Cl.
*G02F 1/1343*    (2006.01)
(52) U.S. Cl. .................. 349/143; 349/144; 349/147
(58) Field of Classification Search .................. 349/143, 349/144, 147
See application file for complete search history.

(56) References Cited

U.S. PATENT DOCUMENTS

| | | | | |
|---|---|---|---|---|
| 4,914,352 A | * | 4/1990 | Gay et al. ................ | 315/169.4 |
| 5,189,548 A | * | 2/1993 | Hecht ......................... | 359/263 |
| 5,392,143 A | * | 2/1995 | Akiyama et al. .............. | 349/55 |
| 5,870,075 A | * | 2/1999 | Yamazaki et al. ............. | 345/92 |
| 6,215,538 B1 | * | 4/2001 | Narutaki et al. ............. | 349/106 |
| 2004/0001167 A1 | | 1/2004 | Takeuchi et al. | |
| 2005/0030439 A1 | | 2/2005 | Lyu | |
| 2006/0072048 A1 | | 4/2006 | Lee et al. | |
| 2006/0092367 A1 | | 5/2006 | Shin et al. | |

FOREIGN PATENT DOCUMENTS

CN    1769990    5/2006

* cited by examiner

*Primary Examiner*—Julie-Huyen L Ngo
(74) *Attorney, Agent, or Firm*—Jianq Chyun IP Office

(57) ABSTRACT

A pixel structure suitable for being disposed on a substrate is provided. The pixel structure includes a scan line, a data line, a thin film transistor (TFT), a primary pixel electrode, and at least one secondary pixel electrode. The scan line and the data line are disposed on the substrate. The TFT is disposed on the substrate and is electrically connected to the scan line and the data line. The primary pixel electrode is electrically connected to a drain electrode of the TFT through a contact hole. The secondary pixel electrode is disposed above the drain electrode and the drain electrode is electrically coupled to the secondary pixel electrode. Besides, a liquid crystal display (LCD) panel having the pixel structure is also provided.

20 Claims, 12 Drawing Sheets

PIXEL STRUCTURE AND LIQUID CRYSTAL DISPLAY PANEL

CROSS-REFERENCE TO RELATED APPLICATION

This application claims the priority benefit of Taiwan application serial no. 96102845, filed Jan. 25, 2007. All disclosure of the Taiwan application is incorporated herein by reference.

BACKGROUND OF THE INVENTION

1. Field of the Invention

The present invention relates to a pixel structure and a liquid crystal display (LCD) panel having the pixel structure. More particularly, the present invention relates to an LCD panel with low color shift and a pixel structure thereof.

2. Description of Related Art

Thin film transistor liquid crystal display (TFT-LCD) has become the mainstream in display market for it having such advantages as high image quality, high space efficiency, low power consumption, and no radiation etc. Presently, the performance of an LCD is proceeding towards high contrast ratio, rapid response, and wide viewing angle, wherein a multi-domain vertically alignment (MVA) TFT-LCD and a multi-domain horizontal alignment (MHA) TFT-LCD are usually adopted to achieve wide-angle display.

FIG. 1 is a cross-sectional view of a conventional MVA TFT-LCD. Referring to FIG. 1, the MVA TFT-LCD 100 includes a TFT array substrate 110, a color filter substrate 120, and a liquid crystal layer 130. In particular, a protrusion 140 or a slit pattern (not shown) is disposed on the TFT array substrate 110 and the color filter substrate 120, so that the liquid crystal molecules 132 in the liquid crystal layer 130 orient in different directions to form a 4-domain distribution when an electric field is generated between the two substrates 120 and 130. Accordingly, a wide-angle display effect is achieved.

However, the MVA or MHA TFT-LCD still has the problem in color shift. Here, color shift refers to the phenomenon that when a user looks at a display from different angles, the user will see an image of different color tones. In particular, the image will produce a color washout effect when the user looks at the image from a large viewing angle. Color shift is produced because of the large luminance at medium or low gray scale, and the luminance at medium or low gray scale has to be reduced in order to reduce color shift. Thus, the U.S. Publication No. US2005/0030439 disclosed a pixel structure, wherein a pixel is further divided to form multiple domains.

FIG. 2 is a top view of a color filter substrate in U.S. Publication No. US2005/0030439, and FIG. 3 is a top view of a TFT array substrate in U.S. Publication No. US2005/0030439. Referring to both FIG. 2 and FIG. 3, a first pixel electrode 190a and a second pixel electrode 190b are respectively located in a left domain and a right domain of a pixel. The first pixel electrode 190a is electrically connected to a drain electrode 175 through a contact hole 181, and the drain electrode 175 is extended below the second pixel electrode 190b. Thus, a voltage over the second pixel electrode 190b drops due to capacitor's coupling effect, so that the voltage supplied to the second pixel electrode 190b is smaller than the voltage supplied to the first pixel electrode 190a. Because the voltage over the first pixel electrode 190a and the voltage over the second pixel electrode 190b are different, such a effect that the domain of the second pixel electrode 190b is darker at medium or low gray scale and the domains of the first pixel electrode 190a and the second pixel electrode 190b have close luminance at high gray scale can be achieved.

In addition, the drain electrode 175 is opaque, therefore the drain electrode 175 has to be disposed corresponding to the protrusion 272 on the color filter substrate in FIG. 2 so as to prevent the aperture ratio of the pixel from being reduced.

However, considering with different panel sizes and pixel resolutions, the distances between the protrusions or between slits have to be maintained in order to optimize the characteristics of the panel, such as response time, transmittance, and so on. Thus, in foregoing design, i.e., the left and right layout of the first pixel electrode 190a and the second pixel electrode 190b, it is difficult to adjust the area ratio of various pixel electrodes. And besides, if the panel shifts so that the drain electrode 175 is not disposed corresponding to the protrusion 272, the aperture ratio of the panel will be seriously affected.

SUMMARY OF THE INVENTION

Accordingly, the present invention is directed to a pixel structure. A liquid crystal display (LCD) panel having the pixel structure has low color shift, and can easily adjust the area ratio of various sub-pixels and prevent the aperture ratio of the pixel structure from being reduced.

Accordingly, the present invention is also directed to an LCD panel for reducing color shift.

The present invention is directed to a pixel structure. The pixel structure is suitable for being disposed on a substrate. The pixel structure includes a scan line, a data line, a thin film transistor (TFT), a primary pixel electrode, and at least one secondary pixel electrode. The scan line and the data line are disposed on the substrate. The TFT is disposed on the substrate and is electrically connected to the scan line and the data line. The primary pixel electrode is electrically connected to a drain electrode of the TFT through a contact hole. The secondary pixel electrode is disposed above the drain electrode, and the drain electrode is electrically coupled to the secondary pixel electrode.

According to an embodiment of the present invention, the drain electrode below the secondary pixel electrode surrounds a periphery of the secondary pixel electrode.

According to an embodiment of the present invention, the drain electrode below the secondary pixel electrode includes a main body and an extension. The main body is disposed below one side of the secondary pixel electrode and proximate to the scan line. The extension is extended from the main body to the primary pixel electrode and is electrically connected to the primary pixel electrode.

According to an embodiment of the present invention, an area ratio of the primary pixel electrode to the secondary pixel electrode is between 1:1 and 1:2.

According to an embodiment of the present invention, the pixel structure includes a primary pixel electrode, a first secondary pixel electrode, and a second secondary pixel electrode, and an area ratio of the primary pixel electrode, the first secondary pixel electrode, and the second secondary pixel electrode is 1:1:2.

According to an embodiment of the present invention, the pixel structure includes a primary pixel electrode, a first secondary pixel electrode, a second secondary pixel electrode, and a third secondary pixel electrode, and an area ratio of the primary pixel electrode, the first secondary pixel electrode, the second secondary pixel electrode, and the third secondary pixel electrode is 1:1:1:2.

According to an embodiment of the present invention, the pixel structure further includes a common electrode disposed on the substrate, and the common electrode is electrically coupled to the primary pixel electrode and the secondary pixel electrode.

According to an embodiment of the present invention, the pixel structure further includes a first alignment pattern disposed on the primary pixel electrode and the secondary pixel electrode. The first alignment pattern may be an alignment protrusion pattern or an alignment slit pattern.

The present invention is also directed to an LCD panel. The LCD panel includes a TFT array substrate, a color filter substrate, and a liquid crystal layer. The TFT array substrate has a plurality of pixel structures, wherein each of the pixel structures includes a scan line, a data line, a TFT, a primary pixel electrode, and at least one secondary pixel electrode. The scan line and the data line are disposed on the TFT array substrate. The TFT is disposed on the TFT array substrate and is electrically connected to the scan line and the data line. The primary pixel electrode is electrically connected to a drain electrode of the TFT through a contact hole. The secondary pixel electrode is disposed above the drain electrode, and the drain electrode is electrically coupled to the secondary pixel electrode. The color filter substrate is disposed opposite to the TFT array substrate. The liquid crystal layer is disposed between the TFT array substrate and the color filter substrate.

According to an embodiment of the present invention, the drain electrode below the secondary pixel electrode surrounds a periphery of the secondary pixel electrode.

According to an embodiment of the present invention, the drain electrode below the secondary pixel electrode includes a main body and an extension. The main body is disposed below one side of the secondary pixel electrode and proximate to the scan line. The extension is extended from the main body to the primary pixel electrode and is electrically connected to the primary pixel electrode.

According to an embodiment of the present invention, an area ratio of the primary pixel electrode to the secondary pixel electrode is between 1:1 and 1:2.

According to an embodiment of the present invention, the pixel structure includes a primary pixel electrode, a first secondary pixel electrode, and a second secondary pixel electrode, and an area ratio of the primary pixel electrode, the first secondary pixel electrode, and the second secondary pixel electrode is 1:1:2.

According to an embodiment of the present invention, the pixel structure includes a primary pixel electrode, a first secondary pixel electrode, a second secondary pixel electrode, and a third secondary pixel electrode, and an area ratio of the primary pixel electrode, the first secondary pixel electrode, the second secondary pixel electrode, and the third secondary pixel electrode is 1:1:1:2.

According to an embodiment of the present invention, the pixel structure further includes a common electrode disposed on the substrate, and the common electrode is electrically coupled to the primary pixel electrode and the secondary pixel electrode.

According to an embodiment of the present invention, the LCD panel further includes a first alignment pattern disposed on the primary pixel electrode and the secondary pixel electrode. The first alignment pattern may be an alignment protrusion pattern or an alignment slit pattern.

According to an embodiment of the present invention, the LCD panel further includes a second alignment pattern disposed on the color filter substrate. The second alignment pattern may be an alignment protrusion pattern or an alignment slit pattern.

According to the pixel division design provided by the present invention, a pixel is divided into two or more sub-pixels, and an area ratio between a coupling capacitance, a storage capacitance, and a liquid crystal capacitance is adjusted by electrically connecting the drain electrode of the TFT to the primary pixel electrode and electrically coupling the drain electrode of the TFT to the secondary pixel electrode. Thus, different sub-pixels have different pixel voltage levels, so that color shift is reduced. Besides, the coupling capacitor can be easily adjusted through different design of the drain electrode's shape. Moreover, a drain electrode of special shape may be used for replacing the light-shielding layer on the color filter substrate for shielding those domains showing abnormal displays.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 4:
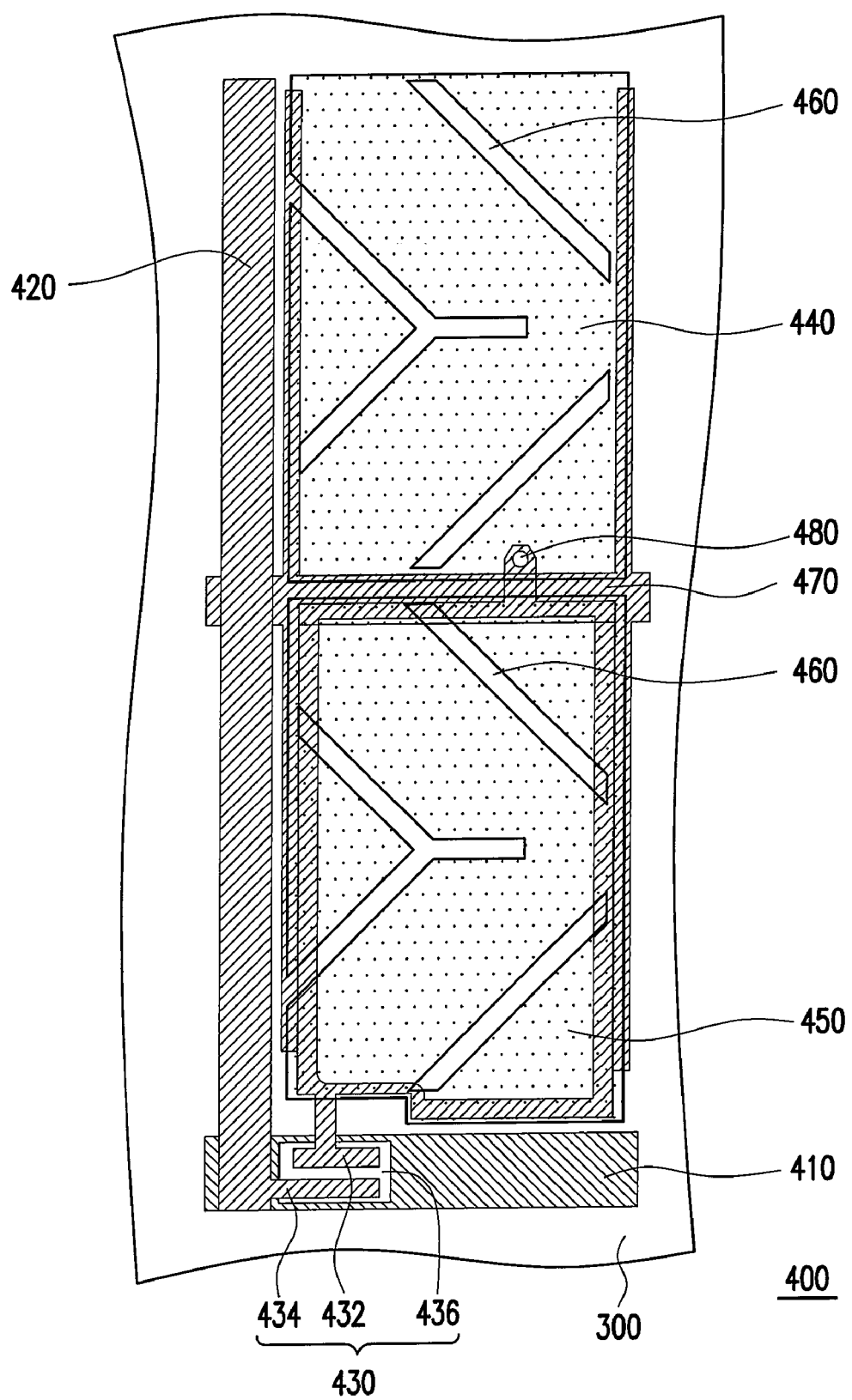
FIG. 4 is a top view of a pixel structure according to a first embodiment of the present invention.

FIG. 4 is a top view of a pixel structure according to a first embodiment of the present invention. Referring to FIG. 4, the pixel structure 400 is suitable for being disposed on a substrate 300. The pixel structure 400 includes a scan line 410, a data line 420, a thin film transistor (TFT) 430, a primary pixel electrode 440, and at least one secondary pixel electrode 450 (only one of which is illustrated). The scan line 410 and the data line 420 are disposed on the substrate 300. The TFT 430 is disposed on the substrate 300 and is electrically connected to the scan line 410 and the data line 420. The primary pixel electrode 440 is electrically connected to a drain electrode 432 of the TFT 430 through a contact hole 480. The secondary pixel electrode 450 is disposed above the drain electrode 432, and the drain electrode 432 is electrically coupled to the secondary pixel electrode 450.

Referring to FIG. 4, the pixel structure 400 may further include a common electrode 470 disposed on the substrate 300, and the common electrode 470 is electrically coupled to the primary pixel electrode 440 and the secondary pixel electrode 450. Accordingly, a storage capacitor is formed by the common electrode 470, the primary pixel electrode 440, and the secondary pixel electrode 450, so that the voltages supplied to the primary pixel electrode 440 and the secondary pixel electrode 450 can be sustained for a relatively long period.

Moreover, the pixel structure 400 may also include a first alignment pattern 460 disposed on the primary pixel electrode 440 and the secondary pixel electrode 450. The first alignment pattern 460 may be an alignment protrusion pattern or an alignment slit pattern. An LCD panel having the pixel structure 400 can provide a wide viewing angle through the disposition of the first alignment pattern 460.

In addition, the TFT 430 is formed on the scan line 410 and uses a portion of the scan line 410 as its gate. The TFT 430 includes a gate (i.e. a portion of the scan line 410), a drain electrode 432, a source electrode 434, and a channel layer 436. The details of the TFT 430 and variations thereof should be understood by those skilled in the art, therefore which will not be described herein.

Referring to FIG. 4 again, the pixel structure 400 has the primary pixel electrode 440 and the secondary pixel electrode 450, and the primary pixel electrode 440 and the secondary pixel electrode 450 respectively has 4 domains. The drain electrode 432 of the TFT 430 is electrically coupled to the secondary pixel electrode 450, and the drain electrode 432 is electrically connected to the primary pixel electrode 440 through the contact hole 480. Thus, when the primary pixel electrode 440 and the secondary pixel electrode 450 are supplied with the same data voltage through the data line 420, different electric fields are formed in the domains of the primary pixel electrode 440 and the domains of the secondary pixel electrode 450. In other words, the orientation of the liquid crystal molecules (not shown) in different directions can be achieved in the domains of the primary pixel electrode 440 and the secondary pixel electrode 450, so that an 8-domain distribution can be achieved.

As described above, the domains in the secondary pixel electrode 450 are darker while displaying an image of medium or low gray scale, while the domains of the primary pixel electrode 440 and the secondary pixel electrode 450 have close luminance while displaying an image of high gray scale. As a result, color shift produced while viewing the image from a large oblique angle can be reduced.

It should be noted here that in the pixel structure 400 illustrated in FIG. 4, the drain electrode 432 below the secondary pixel electrode 450 surrounds a periphery of the secondary pixel electrode 450. Thus, the drain electrode 432 can replace the light-shielding layer (not shown) located at the side of the color filter substrate (not shown) for shielding those domains showing abnormal displays. In addition, by fabricating the light-shielding drain electrode 432 during the fabricating process of the TFT 430, the problem of uneven display caused by shifting while assembling the color filter substrate (not shown) and the substrate 300 can be prevented.

Figure 5:
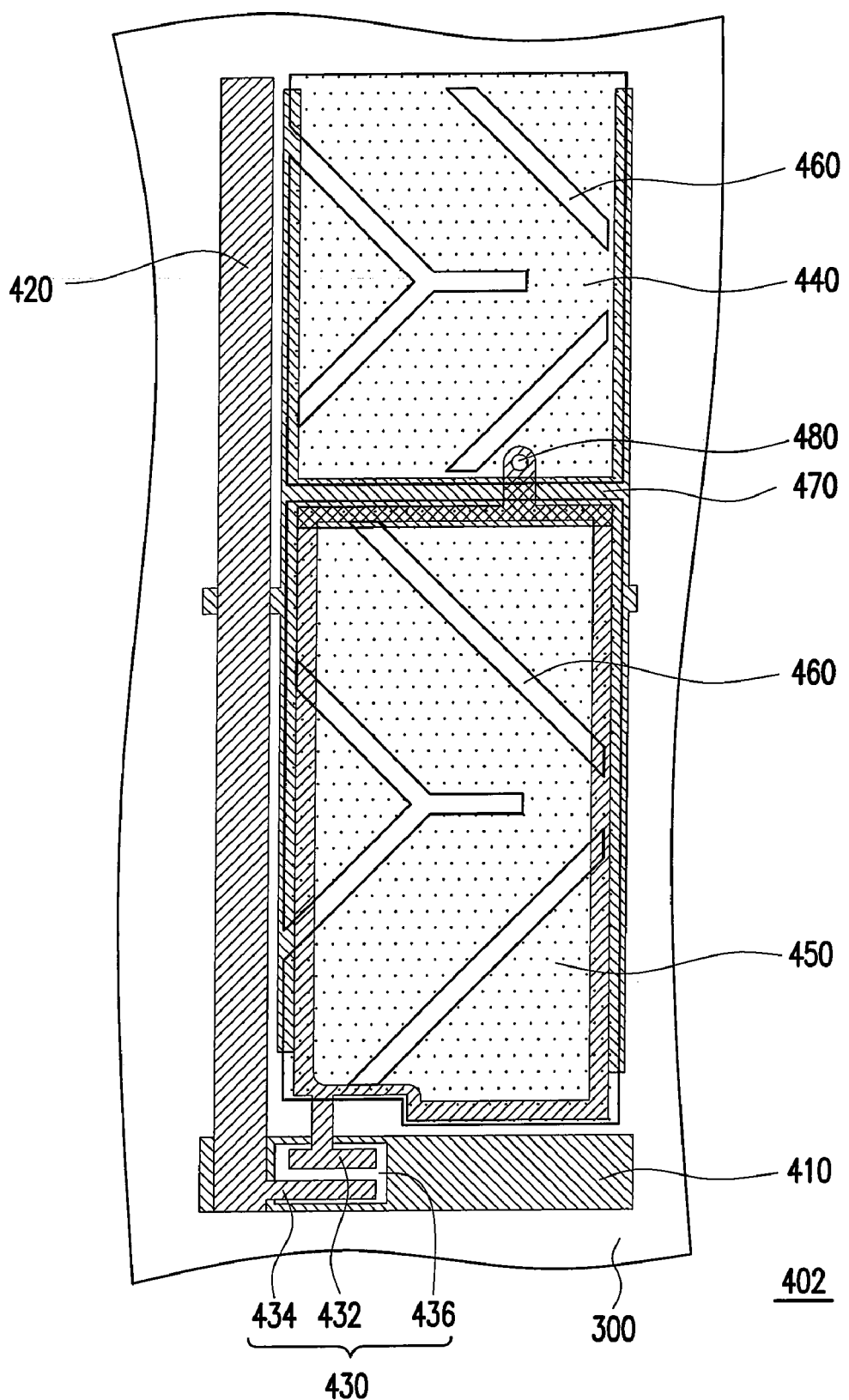
FIG. 5 is a top view of a pixel structure according to a second embodiment of the present invention.

FIG. 5 is a top view of a pixel structure according to a second embodiment of the present invention. Referring to FIG. 5, the pixel structure 402 is similar to the pixel structure 400 in FIG. 4, wherein like reference numerals refer to like components, and those similar components will not be described herein. It should be noted that in FIG. 5, the primary pixel electrode 440 and the secondary pixel electrode 450 have different areas.

Figure 1:
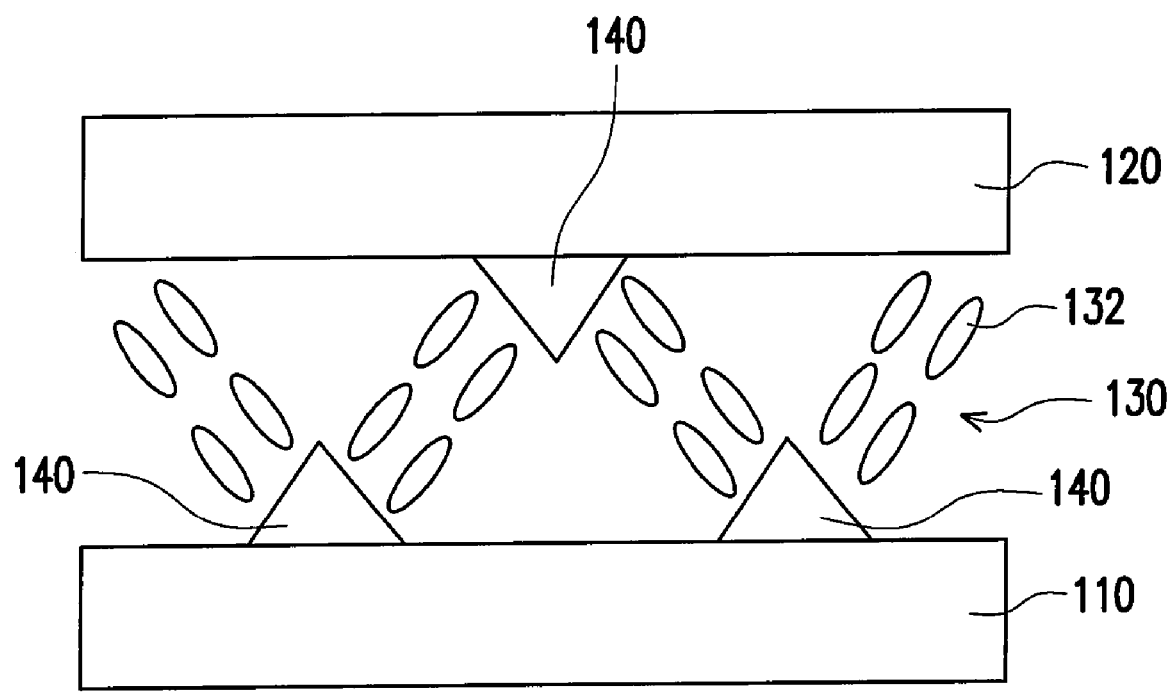
FIG. 1 is a cross-sectional view of a conventional multi-domain vertically alignment (MVA) thin film transistor liquid crystal display (TFT-LCD).
Figure 2:
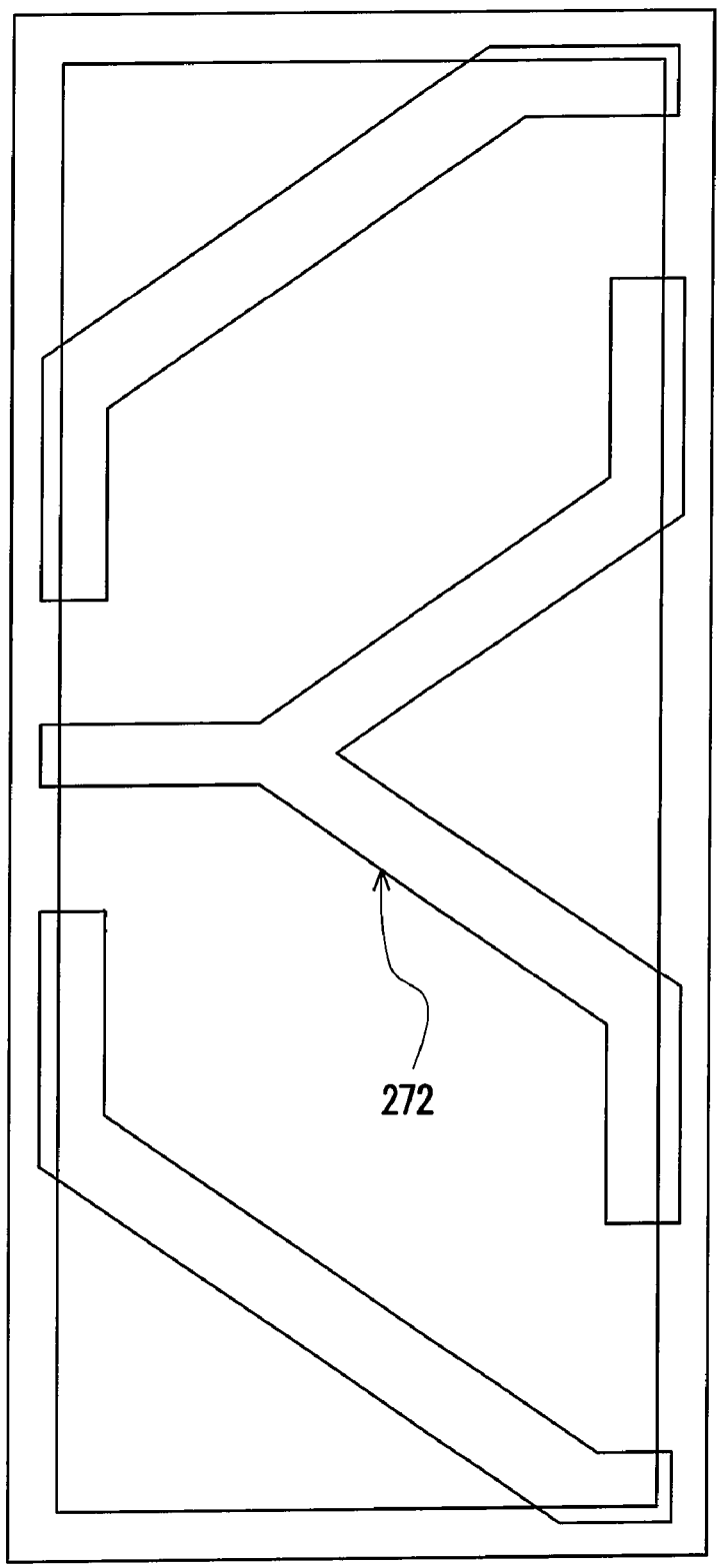
FIG. 2 is a top view of a color filter substrate disclosed in U.S. Publication No. US 2005/0030439.
Figure 3:
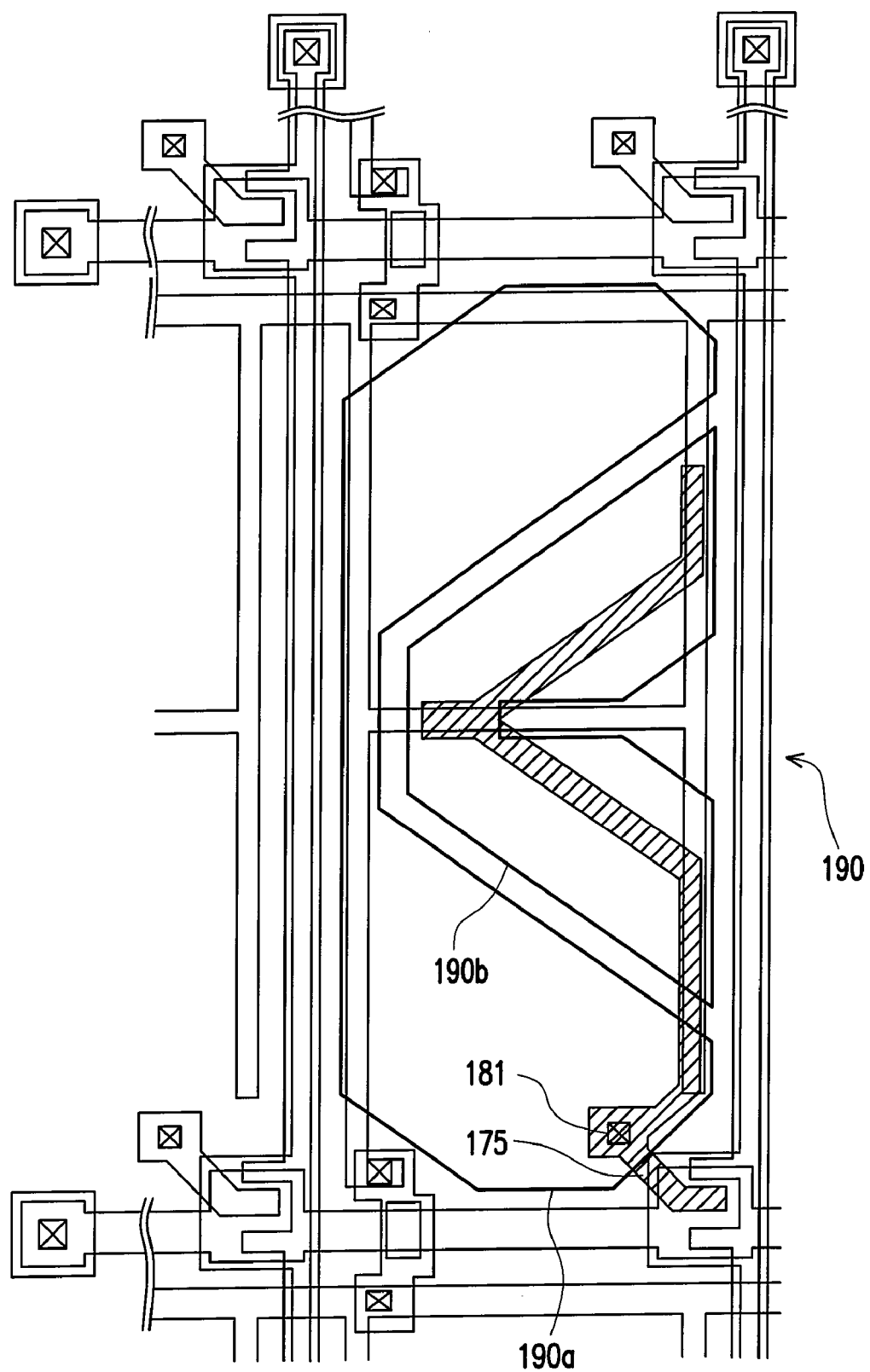
FIG. 3 is a top view of a TFT array substrate disclosed in U.S. Publication No. US 2005/0030439.

Color shift can be further reduced by adjusting an area ratio of the primary pixel electrode 440 to the secondary pixel electrode 450. In particular, according to an embodiment of the present invention, an area ratio of the primary pixel electrode 440 to the secondary pixel electrode 450 in the pixel structures 400 and 402 is between 1:1 and 1:2. In addition, the primary pixel electrode 440 and the secondary pixel electrode 450 are independent of each other and are respectively disposed at two sides of the common electrode 470. Thus, compared to a conventional pixel structure (for example, the one in FIG. 2), in the present invention, an area ratio of the primary pixel electrode 440 and the secondary pixel electrode 450 can be easily adjusted by adjusting the position of the common electrode 470.

Figure 6:
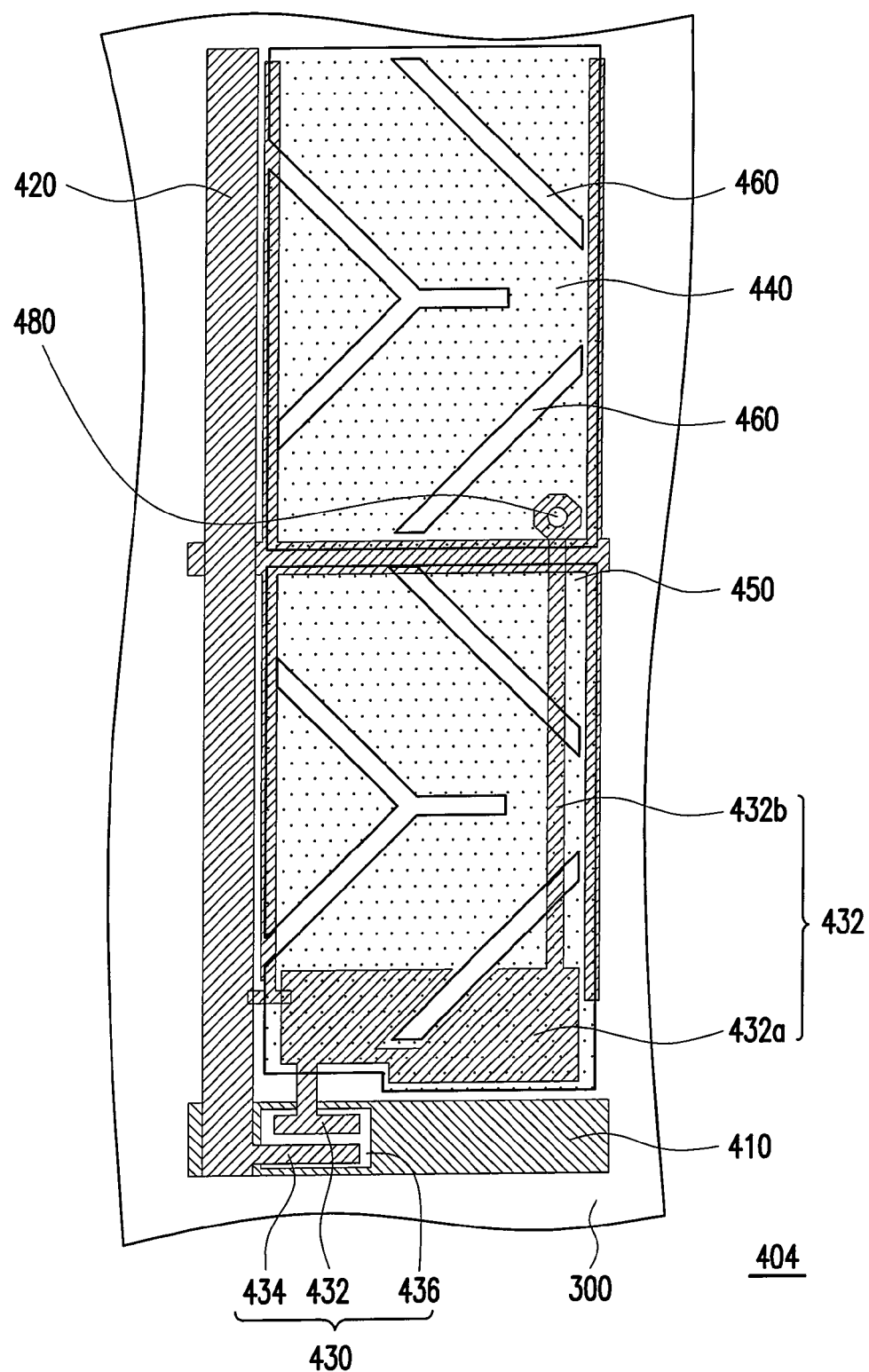
FIG. 6 is a top view of a pixel structure according to a third embodiment of the present invention.

FIG. 6 is a top view of a pixel structure according to a third embodiment of the present invention. Referring to FIG. 6, the pixel structure 404 is similar to the pixel structure 400 in FIG. 4, wherein like reference numerals refer to like components, therefore those similar components will not be described herein.

It should be noted here that in the present embodiment, the drain electrode 432 below the secondary pixel electrode 450 includes a main body 432a and an extension 432b. The main body 432a is disposed below one side of the secondary pixel electrode 450 and proximate to the scan line 410. The extension 432b is extended from the main body 432a to the primary pixel electrode 440 and is electrically connected to the primary pixel electrode 440.

Similarly, the drain electrode 432 of the TFT 430 is electrically coupled to the secondary pixel electrode 450, and the extension 432b of the drain electrode 432 is electrically connected to the primary pixel electrode 440 through the contact hole 480. Thus, when the same data voltage is supplied to the primary pixel electrode 440 and the secondary pixel electrode 450 through the data line 420, different electric fields are formed in the domains of the primary pixel electrode 440 and the secondary pixel electrode 450, and accordingly color shift is reduced.

It should be noted here that the drain electrode 432 has the main body 432a and the extension 432b, so that the coupling capacitance can be easily adjusted by adjusting the area of the main body 432a. Moreover, uneven domains can be prevented through appropriate design of the extension 432b. Furthermore, short circuit can be prevented in the present design because the drain electrode 432 is away from the data line 420.

Figure 7:
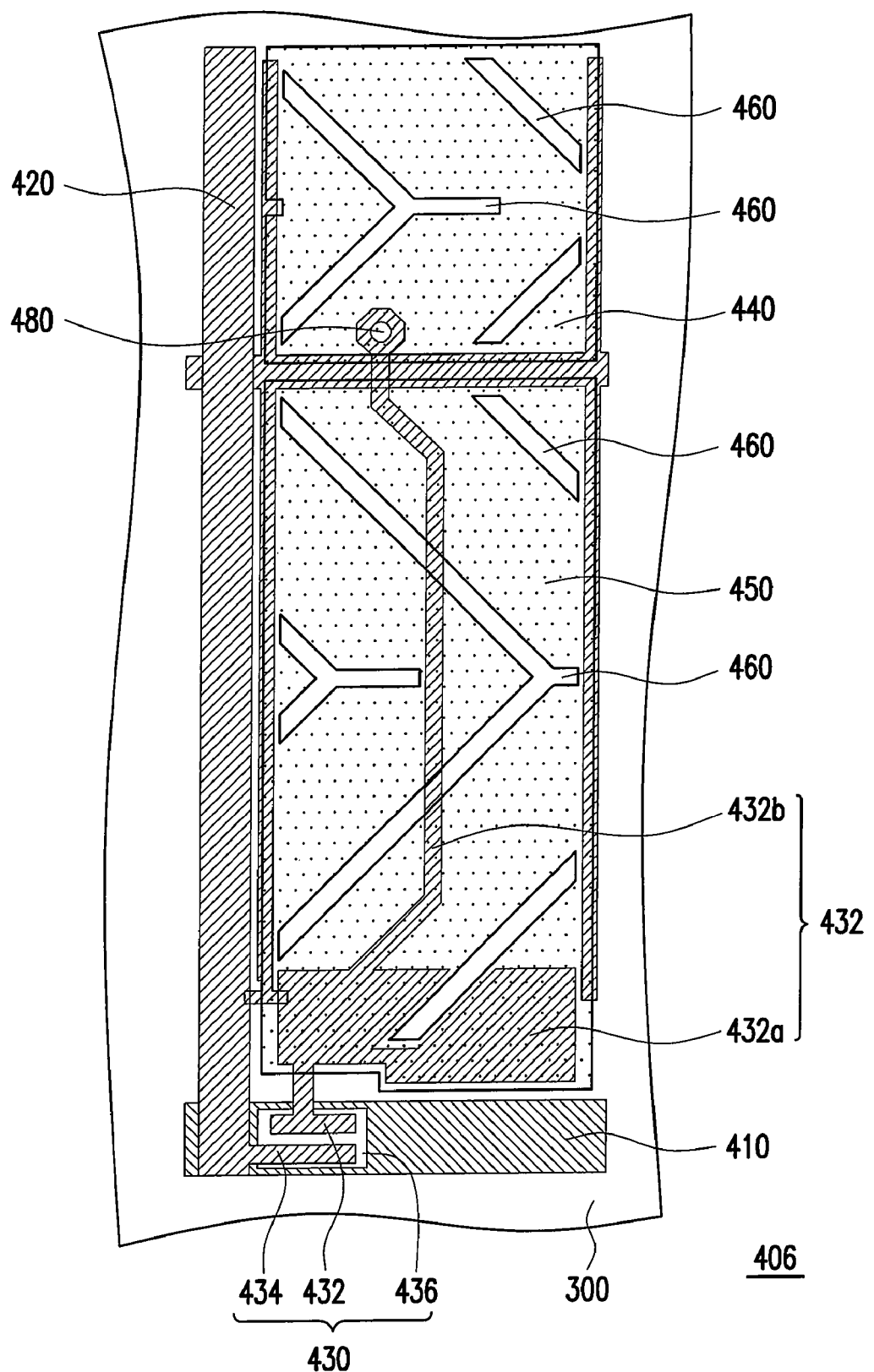
FIG. 7 is a top view of a pixel structure according to a fourth embodiment of the present invention.

FIG. 7 is a top view of a pixel structure according to a fourth embodiment of the present invention. The pixel structure 406 is similar to the pixel structure 404 in FIG. 6, wherein like reference numerals refer to like components, therefore similar components will not be described herein. It should be noted that in FIG. 7, the primary pixel electrode 440 and the secondary pixel electrode 450 have different areas. According to an embodiment of the present invention, an area ratio of the primary pixel electrode 440 to the secondary pixel electrode 450 in the pixel structures 404 and 406 is between 1:1 and 1:2. Accordingly, color shift can be further reduced in the pixel structure 404 and 406.

A primary pixel electrode 440 and only one secondary pixel electrode 450 are described in foregoing pixel structures 400, 402, 404, and 406; however, the pixel structure in the present invention may have multiple secondary pixel electrodes 450.

Figure 8:
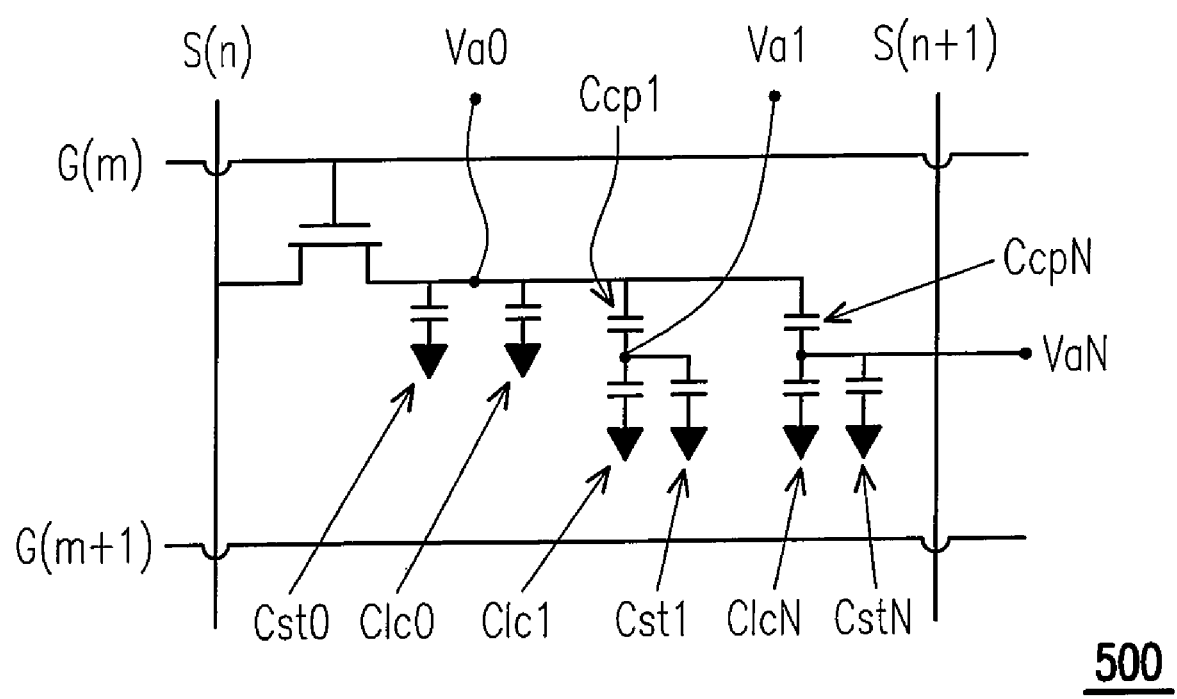
FIG. 8 is an equivalent circuit diagram of a pixel structure according to an embodiment of the present invention.

FIG. 8 is an equivalent circuit diagram of a pixel structure according to an embodiment of the present invention. Referring to FIG. 8, a pixel division design including 3 or more subs-pixels is adopted in the pixel structure 500, wherein by adjusting a ratio between a coupling capacitance, a storage capacitance, and a liquid crystal capacitance, different sub-pixels have different pixel voltage levels, so that color shift can be reduced further.

Referring to both FIG. 7 and FIG. 8, G(m) represents the $m^{th}$ scan line, G(m+1) represents the (m+1)$^{th}$ scan line, S(n) represents the $n^{th}$ data line, and S(n+1) represents the (n+1)$^{th}$ data line. Va0 represents the supplied data voltage, and VaN represents the pixel voltage of the $N^{th}$ sub-pixel, wherein N is a positive integer. Cst0 and Clc0 respectively represent the storage capacitor and the liquid crystal capacitor of the primary pixel electrode 440. Cst1, Clc1, and Ccp1 respectively represent the storage capacitor, the liquid crystal capacitor, and the coupling capacitor of the first secondary pixel electrode 450. CstN, ClcN, and CcpN respectively represent the storage capacitor, the liquid crystal capacitor, and the coupling capacitor of the $N^{th}$ secondary pixel electrode 450. The pixel voltage level of the $N^{th}$ secondary pixel electrode conforms to following expression (1)

$$VaN = (Va0) \times \frac{CcpN}{CcpN + ClcN + CstN} \qquad (1)$$

The pixel structures of N=2 (i.e. with 3 sub-pixels) and N=3 (i.e. with 4 sub-pixels) will be further described below.

Figure 9A:
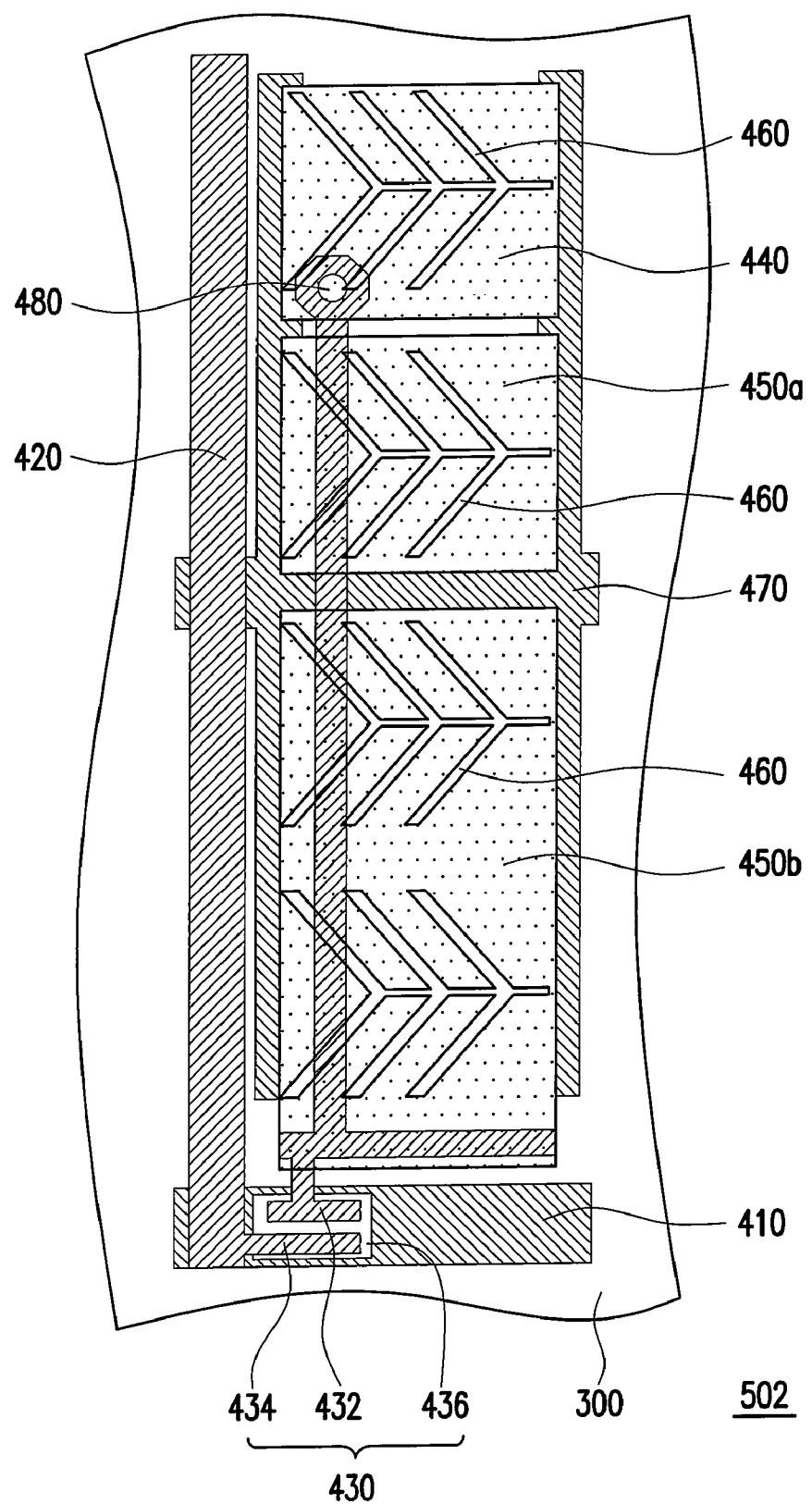
FIG. 9A is a top view of a pixel structure according to a fifth embodiment of the present invention.
Figure 9B:
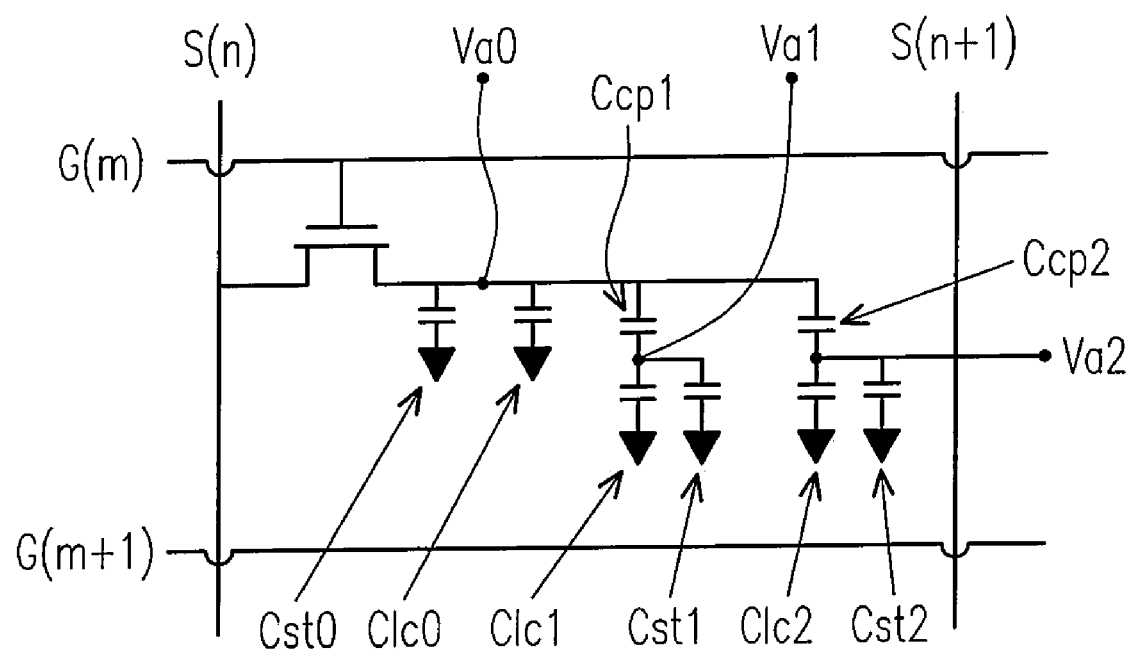
FIG. 9B is an equivalent circuit diagram of the pixel structure in FIG. 9A.

FIG. 9A is a top view of a pixel structure according to a fifth embodiment of the present invention, and FIG. 9B is an equivalent circuit diagram of the pixel structure in FIG. 9A. Referring to both FIG. 9A and FIG. 9B, the present embodiment shows the case as N=2, and the pixel structure 502 is similar to the pixel structures 400, 402, 404, 406, and 500 described above, wherein like reference numerals refer to like components, therefore those similar components will not be described herein.

It should be noted that the pixel structure 502 includes a primary pixel electrode 440, a first secondary pixel electrode 450a, and a second secondary pixel electrode 450b, and an area ratio of the primary pixel electrode 440, the first secondary pixel electrode 450a, and the second secondary pixel electrode 450b is 1:1:2.

As illustrated in FIG. 9A and FIG. 9B, the pixel structure 502 is divided into 3 sub-pixels, wherein the primary pixel electrode 440 has a storage capacitor Cst0 and a liquid crystal capacitor Clc0; the first secondary pixel electrode 450a has a storage capacitor Cst1, a liquid crystal capacitor Clc1, and a coupling capacitor Ccp1; the second secondary pixel electrode 450b has a storage capacitor Cst2, a liquid crystal capacitor Clc2, and a coupling capacitor Ccp2.

Referring to FIG. 9A again, the drain electrode 432 is connected to the primary pixel electrode 440 through the contact hole 480, and the drain electrode 432 is located below the first secondary pixel electrode 450a and the second secondary pixel electrode 450b as a coupling electrode. Thus, it is not necessary to design another coupling electrode in the pixel structure 502, therefore the aperture ratio of the pixel structure 502 is greatly increased.

Figure 10:
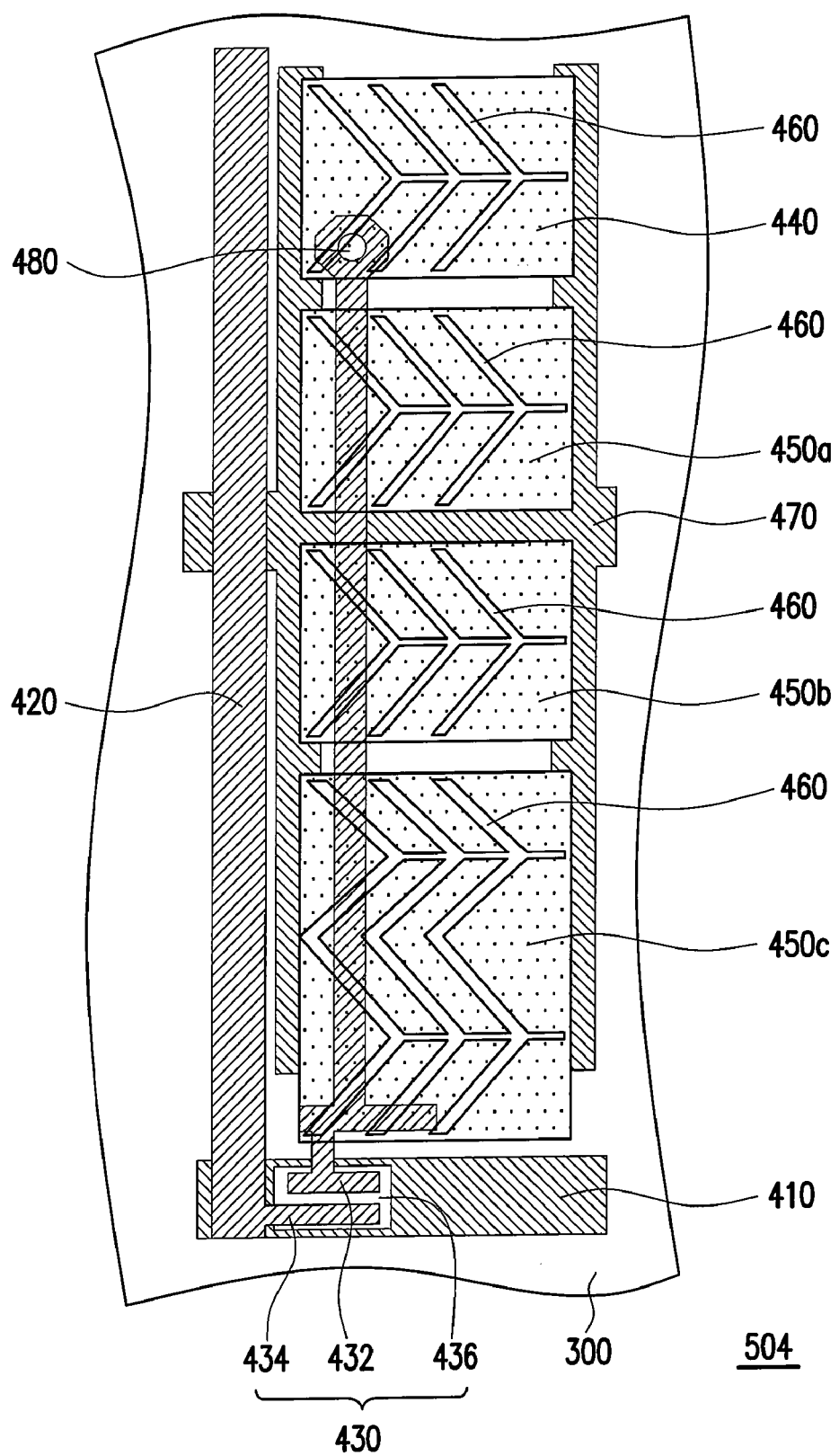
FIG. 10 is a top view of a pixel structure according to a sixth embodiment of the present invention.

FIG. 10 is a top view of a pixel structure according to a sixth embodiment of the present invention. Referring to FIG. 10, the present embodiment shows the case as N=3, and the pixel structure 504 is similar to the pixel structures 400, 402, 404, 406, 500, and 502, wherein like reference numerals refer to like components, therefore those similar components will not be described herein.

It should be noted that the pixel structure 504 includes a primary pixel electrode 440, a first secondary pixel electrode 450a, a second secondary pixel electrode 450b, and a third secondary pixel electrode 450c, and an area ratio of the primary pixel electrode 440, the first secondary pixel electrode 450a, the second secondary pixel electrode 450b, and the third secondary pixel electrode 450c is 1:1:1:2.

Moreover, as shown in FIG. 10, the pixel structure 504 is divided into 4 sub-pixels, wherein the primary pixel electrode 440 has a storage capacitor Cst0 and a liquid crystal capacitor Clc0; the first secondary pixel electrode 450a has a storage capacitor Cst1, a liquid crystal capacitor Clc1, and a coupling capacitor Ccp1; the second secondary pixel electrode 450b has a storage capacitor Cst2, a liquid crystal capacitor Clc2, and a coupling capacitor Ccp2; the third secondary pixel electrode 450c has a storage capacitor Cst3, a liquid crystal capacitor Clc3, and a coupling capacitor Ccp3. Namely, the more sub-pixels are divided in a pixel structure, the more reduction of color shift is achieved.

In summary, a pixel structure is divided into a plurality of sub-pixels including a primary pixel and secondary pixels, wherein the primary pixel is electrically connected to the drain electrode of the TFT and the secondary pixels are electrically coupled to the drain electrode of the TFT. Accordingly, when the same data voltage is supplied, different sub-pixels have different pixel voltages through different Ccp ratio, and further reduces color shift.

Figure 11:
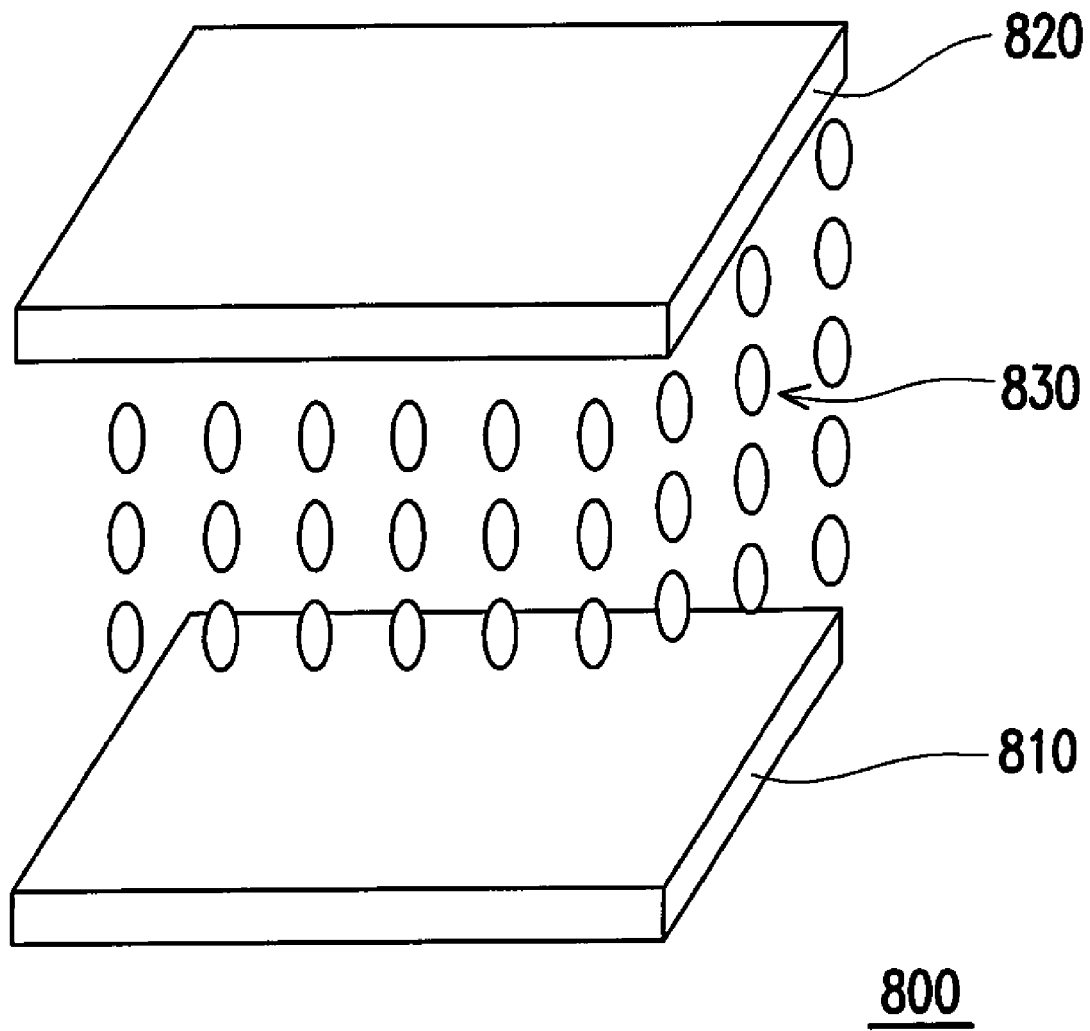
FIG. 11 is a perspective view of an LCD panel according to an embodiment of the present invention.

FIG. 11 is a perspective view of a LCD panel according to an embodiment of the present invention. Referring to FIG. 11, the LCD panel 800 includes a TFT array substrate 810, a color filter substrate 820, and a liquid crystal layer 830. The TFT array substrate 810 has a plurality of pixel structures (not shown), and the pixel structure may be any one kind of foregoing pixel structures 400, 402, 404, 406, 500, 502, and 504. In addition, the details of the pixel structures have been described, therefore same contents will not be described again. The color filter substrate 820 is disposed opposite to the TFT array substrate 810. The liquid crystal layer 830 is disposed between the TFT array substrate 810 and the color filter substrate 820.

Since the LCD panel 800 has forgoing pixel structures, color shift can be effectively reduced when a user looks at the LCD panel 800 from an oblique viewing angle.

In addition, the LCD panel 800 further includes a second alignment pattern (not shown) disposed on the color filter substrate 820. The second alignment pattern may be an alignment protrusion pattern or an alignment slit pattern. A better wide-angle display effect can be achieved with the second alignment pattern along with the first alignment pattern 460 disposed on the TFT array substrate 810 (referring to FIG. 4). However, the disposition manners and shapes of the alignment protrusion pattern and the alignment slit pattern are not limited in the present invention, and which may be MVA or other variations.

In summary, the pixel structure and LCD panel of the present invention has at least following advantages.

(1) By electrically connecting the drain electrode of the TFT to the primary pixel electrode and electrically coupling the drain electrode of the TFT to the secondary pixel electrode, and also by adjusting a ratio between a coupling capacitance, a storage capacitance, and a liquid crystal capacitance, different sub-pixels can have different pixel voltage levels. Accordingly, color shift can be reduced.

(2) The pixel may be divided into 3 or more sub-pixels, so that color shift can be further reduced.

(3) The area ratio of the primary pixel electrode to the secondary pixel electrode can be easily adjusted, so that the margin of pixel design is increased and color shift is further reduced.

(4) With different shape designs of the drain electrode, the coupling capacitance can be easily adjusted. And, the possibility of short circuit between the drain electrode and the data line can be reduced also. Moreover, a drain electrode of special shape can be used for replacing a light-shielding layer on the color filter substrate for shielding those domains showing abnormal displays.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, suitable for being disposed on a substrate, comprising:
    a scan line and a data line, disposed on the substrate;
    a thin film transistor (TFT), disposed on the substrate and electrically connected to the scan line and the data line;
    a primary pixel electrode, electrically connected to a drain electrode of the TFT through a contact hole; and
    at least one secondary pixel electrode, disposed above the drain electrode, wherein the drain electrode is electrically coupled to the at least one secondary pixel electrode.

2. The pixel structure as claimed in claim 1, wherein the drain electrode below the secondary pixel electrode surrounds a periphery of the secondary pixel electrode.

3. The pixel structure as claimed in claim 1, wherein the drain electrode below the secondary pixel electrode comprises:
    a main body, disposed below one side of the secondary pixel electrode and proximate to the scan line; and
    an extension, extending from the main body to the primary pixel electrode and electrically connected to the primary pixel electrode.

4. The pixel structure as claimed in claim 1, wherein an area ratio of the primary pixel electrode to the secondary pixel electrode is between 1:1 and 1:2.

5. The pixel structure as claimed in claim 1, wherein the pixel structure comprises the primary pixel electrode, a first secondary pixel electrode and a second secondary pixel electrode, and an area ratio of the primary pixel electrode, the first secondary pixel electrode, and the second secondary pixel electrode is 1:1:2.

6. The pixel structure as claimed in claim 1, wherein the pixel structure comprises the primary pixel electrode, a first secondary pixel electrode, a second secondary pixel electrode, and a third secondary pixel electrode, and an area ratio of the primary pixel electrode, the first secondary pixel electrode, the second secondary pixel electrode, and the third secondary pixel electrode is 1:1:1:2.

7. The pixel structure as claimed in claim 1, further comprising a common electrode disposed on the substrate, and electrically coupled to the primary pixel electrode and the secondary pixel electrode.

8. The pixel structure as claimed in claim 1, further comprising a first alignment pattern disposed on the primary pixel electrode and the secondary pixel electrode.

9. The pixel structure as claimed in claim 8, wherein the first alignment pattern comprises an alignment protrusion pattern or an alignment slit pattern.

10. A liquid crystal display (LCD) panel, comprising:
    a TFT array substrate, having a plurality of pixel structures, wherein each of the pixel structures comprises:
        a scan line and a data line, disposed on the TFT array substrate;
        a TFT, disposed on the TFT array substrate and electrically connected to the scan line and the data line;
        a primary pixel electrode, electrically connected to a drain electrode of the TFT through a contact hole;
        at least one secondary pixel electrode, disposed above the drain electrode, wherein the drain electrode is electrically coupled to the secondary pixel electrode;
    a color filter substrate, disposed opposite to the TFT array substrate; and
    a liquid crystal layer, disposed between the TFT array substrate and the color filter substrate.

11. The LCD panel as claimed in claim 10, wherein the drain electrode below the secondary pixel electrode surrounds a periphery of the secondary pixel electrode.

12. The LCD panel as claimed in claim 10, wherein the drain electrode below the secondary pixel electrode comprises:
    a main body, disposed below one side of the secondary pixel electrode and proximate to the scan line; and
    an extension, extending from the main body to the primary pixel electrode and electrically connected to the primary pixel electrode.

13. The LCD panel as claimed in claim 10, wherein an area ratio of the primary pixel electrode to the secondary pixel electrode is between 1:1 and 1:2.

14. The LCD panel as claimed in claim 10, wherein the pixel structure comprises the primary pixel electrode, a first secondary pixel electrode, and a second secondary pixel electrode, and an area ratio of the primary pixel electrode, the first secondary pixel electrode, and the second secondary pixel electrode is 1:1:2.

15. The LCD panel as claimed in claim 10, wherein the pixel structure comprises the primary pixel electrode, a first secondary pixel electrode, a second secondary pixel electrode, and a third secondary pixel electrode, and an area ratio of the primary pixel electrode, the first secondary pixel electrode, the second secondary pixel electrode, and the third secondary pixel electrode is 1:1:1:2.

16. The LCD panel as claimed in claim 10, further comprising a common electrode disposed on the TFT array substrate, and the common electrode being electrically coupled to the primary pixel electrode and the secondary pixel electrode.

17. The LCD panel as claimed in claim 10, further comprising a first alignment pattern disposed on the primary pixel electrode and the secondary pixel electrode.

18. The LCD panel as claimed in claim 17, wherein the first alignment pattern comprises an alignment protrusion pattern or an alignment slit pattern.

19. The LCD panel as claimed in claim 10, further comprising a second alignment pattern disposed on the color filter substrate.

20. The LCD panel as claimed in claim 19, wherein the second alignment pattern comprises an alignment protrusion pattern or an alignment slit pattern.

* * * * *